(12) United States Patent
Sasaki et al.

(10) Patent No.: US 11,731,575 B2
(45) Date of Patent: Aug. 22, 2023

(54) AIRBAG APPARATUS ATTACHMENT MECHANISM

(71) Applicant: TOYODA GOSEI CO., LTD., Kiyosu (JP)

(72) Inventors: Kenji Sasaki, Kiyosu (JP); Kento Saito, Ama (JP)

(73) Assignee: TOYODA GOSEI CO., LTD., Aichi-pref. (JP)

( * ) Notice: Subject to any disclaimer, the term of this patent is extended or adjusted under 35 U.S.C. 154(b) by 0 days.

(21) Appl. No.: 17/470,547

(22) Filed: Sep. 9, 2021

(65) Prior Publication Data

US 2022/0080918 A1 Mar. 17, 2022

(30) Foreign Application Priority Data

Sep. 14, 2020 (JP) ................................. 2020-153718

(51) Int. Cl.
  *B60R 21/203* (2006.01)
  *B60R 21/214* (2011.01)
  *B60R 21/2165* (2011.01)

(52) U.S. Cl.
  CPC ........ *B60R 21/2037* (2013.01); *B60R 21/203* (2013.01); *B60R 21/214* (2013.01); *B60R 21/21658* (2013.01)

(58) Field of Classification Search
  CPC .............. B60R 21/203; B60R 21/2037; B60R 21/21658
  See application file for complete search history.

(56) References Cited

U.S. PATENT DOCUMENTS

| | | | | | |
|---|---|---|---|---|---|
| 4,789,763 | A | * | 12/1988 | Nagata ................... | B60Q 5/003 200/61.54 |
| 4,808,776 | A | * | 2/1989 | Niwa ..................... | B60Q 5/003 200/61.55 |
| 5,239,147 | A | * | 8/1993 | Allard .................... | B60Q 5/003 200/61.54 |
| 5,508,482 | A | * | 4/1996 | Martin ................... | B60Q 5/003 200/61.54 |

(Continued)

FOREIGN PATENT DOCUMENTS

| | | | | | |
|---|---|---|---|---|---|
| JP | 2001138851 | A | * | 5/2001 | ............. B60Q 5/003 |
| JP | 2010201949 | A | * | 9/2010 | ............. B60Q 5/003 |

(Continued)

*Primary Examiner* — Barry Gooden, Jr.
(74) *Attorney, Agent, or Firm* — Posz Law Group, PLC

(57) ABSTRACT

An airbag apparatus attachment mechanism includes a holder, a supporting member, an urging member, and a functional member. The holder is fastened to a metal core with a fastening member. The supporting member protrudes further forward than an airbag apparatus and is inserted into the holder. The urging member urges the airbag apparatus rearward. The functional member is attached to a part of the supporting member that is inserted in the holder. The functional member includes a spring portion that is thinner than a gap between the supporting member and the holder. The spring portion is disposed in the gap. The functional member is configured such that the spring portion is elastically deformed in a radial direction of the supporting member due to vibration of the airbag apparatus, thereby suppressing the vibration.

11 Claims, 7 Drawing Sheets

(56) References Cited

U.S. PATENT DOCUMENTS

| | | | | |
|---|---|---|---|---|
| 5,775,725 A * | 7/1998 | Hodac | ................ | B60R 21/2037 411/348 |
| 6,062,592 A * | 5/2000 | Sakurai | ............... | B60R 21/2037 280/728.2 |
| 6,082,758 A * | 7/2000 | Schenck | ............ | B60R 21/2037 200/305 |
| 6,139,051 A * | 10/2000 | Fujita | ................... | B60R 21/217 200/61.55 |
| 6,474,682 B2 * | 11/2002 | Ikeda | ................... | B60Q 5/003 200/61.55 |
| 6,478,330 B2 * | 11/2002 | Fujita | ................... | B60Q 5/003 74/552 |
| 6,508,485 B2 * | 1/2003 | Kikuta | .................. | B60Q 5/003 200/61.54 |
| 6,554,312 B2 * | 4/2003 | Sakane | ................. | B60R 21/2037 280/728.2 |
| 6,600,114 B2 * | 7/2003 | Kikuta | .................. | B60Q 5/003 200/61.54 |
| 8,794,662 B2 * | 8/2014 | Ishii | ................... | B60R 21/2037 280/728.2 |
| 9,156,400 B2 * | 10/2015 | Ishii | ................... | B60R 21/2037 |
| 2002/0011721 A1 * | 1/2002 | Kikuta | ................ | B60R 21/2037 280/728.2 |
| 2002/0043786 A1 * | 4/2002 | Schutz | .................. | B60Q 5/003 280/728.2 |
| 2010/0066066 A1 * | 3/2010 | Sakurai | ............... | B60R 21/20 29/894.1 |
| 2010/0219621 A1 * | 9/2010 | Sasaki | .................... | B60Q 5/003 280/731 |
| 2012/0313357 A1 * | 12/2012 | Yamaji | ................. | B60R 21/203 280/731 |
| 2016/0031399 A1 * | 2/2016 | Andersson | ............. | B60R 21/20 280/728.2 |
| 2016/0031480 A1 * | 2/2016 | Ishii | ....................... | B62D 7/222 280/731 |
| 2017/0144594 A1 * | 5/2017 | Obayashi | ................. | B62D 1/04 |
| 2017/0361801 A1 * | 12/2017 | Banno | ................ | B60R 21/2037 |
| 2020/0043679 A1 | 2/2020 | Nonoyama et al. | | |
| 2021/0031684 A1 * | 2/2021 | Matsuo | ............... | B60R 21/2037 |
| 2021/0269080 A1 * | 9/2021 | Kim | ........................ | B62D 1/10 |
| 2022/0055564 A1 * | 2/2022 | Hayakawa | ........... | B60R 21/203 |

FOREIGN PATENT DOCUMENTS

| | | | |
|---|---|---|---|
| JP | 2010202085 A | * | 9/2010 |
| JP | 2017-197185 A | | 11/2017 |
| JP | 2020-019379 A | | 2/2020 |

* cited by examiner

AIRBAG APPARATUS ATTACHMENT MECHANISM

BACKGROUND

1. Field

The present disclosure relates to an airbag apparatus attachment mechanism for attaching an airbag apparatus to a metal core of a steering wheel.

2. Description of Related Art

One type of steering wheel for vehicles such as land vehicles includes a horn switch for activating a horn device and an airbag apparatus, which is configured to protect a driver from an impact applied from the front of the vehicle (for example, Japanese Laid-Open Patent Publication No. 2017-197185).

As shown in FIG. 14, the above-described steering wheel includes a supporting member 111 and a bag holder 105 inserted into the supporting member 111. The supporting member 111 includes a fixed contact 112 at the rear end. When an airbag apparatus 104 is not pushed, a movable contact 117 is separated rearward from the fixed contact 112 of the supporting member 111. The supporting member 111 is electrically connected to a metal core 102, which is grounded to the body of the land vehicle (ground GND), via a fastening member 103. The movable contact 117 and the fixed contact 112 are electrically disconnected from each other (horn switch: OFF), so that the horn device 106 is not activated. In this state, the airbag apparatus 104 functions as a damper mass of a dynamic damper. An elastic member 119 between a slider 113 and a damper holder 118 functions as a spring of the dynamic damper. Thus, when the steering wheel 101 vibrates, the elastic member 119 vibrates together with the airbag apparatus 104 while being elastically deformed at a resonance frequency that is the same as or close to the frequency of the vibration, so that the elastic member 119 absorbs the vibration energy of the steering wheel 101. Such energy absorption suppresses the vibration of the steering wheel 101.

When the airbag apparatus 104 is pushed in the state of FIG. 14, the force applied to the airbag apparatus 104 is transmitted to the movable contact 117 and the slider 113 via a cap member 116. The cap member 116 pushes the slider 113. The slider 113 is slid forward against a spring 115 disposed between the slider 113 and a spring seat 114 at the front end of the supporting member 111. When the movable contact 117 is moved forward together with the cap member 116, and contacts and is electrically connected to the fixed contact 112 (horn switch: ON), the horn device 106 is activated.

In the attachment mechanism 110 of the related art, the fixed contact 112 and the movable contact 117, which form part of the horn switch, are disposed in a part of the attachment mechanism 110 that is attached to the airbag apparatus 104. Also, the elastic member 119 for suppressing vibration is disposed in the part of the attachment mechanism 110 that is attached to the airbag apparatus 104. Accordingly, the size of the attached part is increased in the radial direction of the supporting member 111. Also, the attached part affects the shapes and sizes of the members of the steering wheel 101 disposed around the attached part, for example, a pad portion, which has a decorative surface and is located at the rearmost position in the steering wheel 101. This may increase the size of the pad portion in the radial direction of the supporting member 111 or reduce the flexibility in the shape of the pad portion.

SUMMARY

Accordingly, it is an objective of the present disclosure to provide an airbag apparatus attachment mechanism that is capable of reducing the size of a part attached to an airbag apparatus in the radial direction of a supporting member.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an airbag apparatus attachment mechanism is provided that is configured to attach an airbag apparatus disposed rearward of a metal core of a steering wheel of a vehicle to the metal core. The airbag apparatus attachment mechanism includes a holder, a supporting member, an urging member, and a functional member. The holder is inserted into the metal core and fastened to the metal core by a fastening member. The supporting member is attached to the airbag apparatus. The supporting member extends further forward than the airbag apparatus and being inserted into the holder. The urging member is disposed between the airbag apparatus and the holder and urges the airbag apparatus rearward. The functional member is attached to a part of the supporting member that is inserted in the holder. The functional member is restricted from moving in a front-rear direction. The functional member includes a spring portion that is thinner than a gap between the supporting member and the holder, the spring portion being disposed in the gap. The functional member is configured such that the spring portion is elastically deformed in a radial direction of the supporting member due to vibration of the airbag apparatus, thereby suppressing the vibration.

In another general aspect, an airbag apparatus attachment mechanism is provided that is configured to attach an airbag apparatus disposed rearward of a metal core of a steering wheel of a vehicle to the metal core. The airbag apparatus attachment mechanism includes a holder, a supporting member, an urging member, and a functional member. The holder is made of a material having an electrical insulating property and inserted into the metal core. The holder is fastened to the metal core by a conductive fastening member. The supporting member is attached to the airbag apparatus. The supporting member extends further forward than the airbag apparatus and being inserted into the holder to be slidable in a front-rear direction. The urging member is disposed between the airbag apparatus and the holder and urges the airbag apparatus rearward. The functional member is made of a conductive material and is attached to a part of the supporting member that is inserted in the holder. The functional member is restricted from moving in the front-rear direction. The fastening member forms a fixed contact of a horn switch that switches between activation and deactivation of a horn device in the vehicle. The functional member includes a movable contact that forms the horn switch together with the fastening member. The functional member is configured to, during a non-pushing action of the airbag apparatus, cause the movable contact to be separated rearward from the fastening member to turn off the horn switch, thereby deactivating the horn device. The functional member is also configured to as a pushing action of the airbag apparatus is performed, cause the movable contact to contact the fastening member to turn on the horn switch, thereby activating the horn device.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

An airbag apparatus attachment mechanism 60 according to one embodiment will now be described with reference to FIGS. 1 to 13. The attachment mechanism 60 is used in a land vehicle 10.

Figure 1:
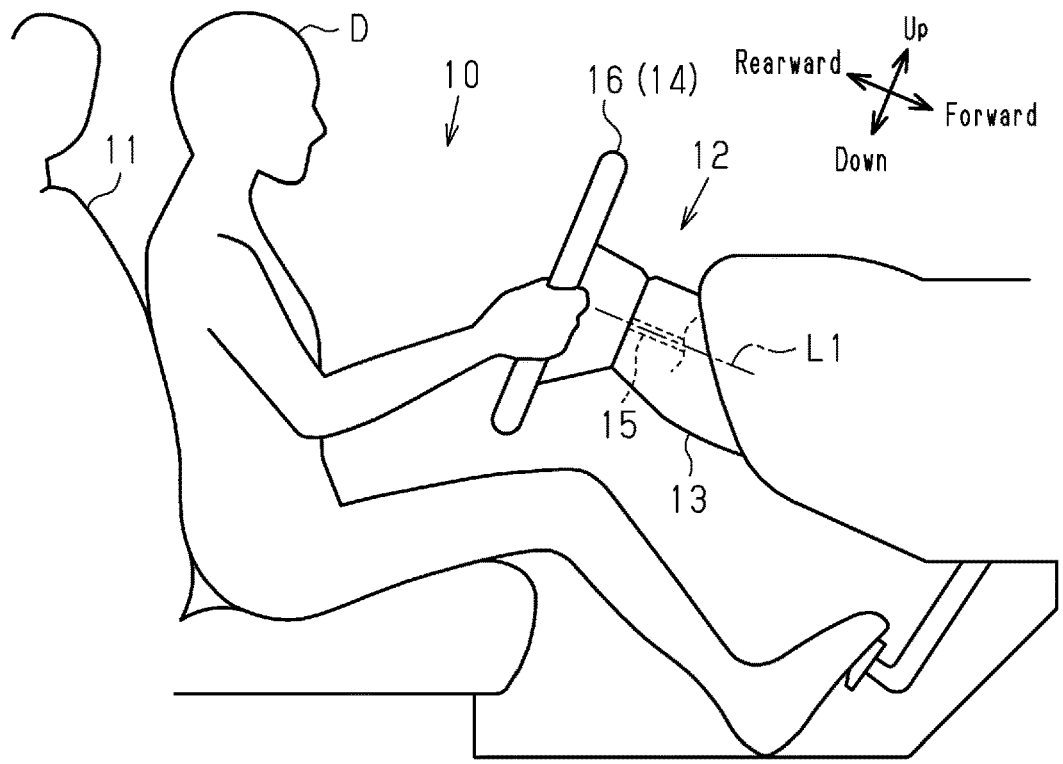
FIG. 1 is a schematic side view showing an airbag apparatus attachment mechanism according to one embodiment, together with a steering wheel and the surrounding structures in a vehicle.

As shown in FIG. 1, the land vehicle 10, which is a vehicle, includes a steering apparatus 12 disposed forward of a driver's seat 11. The steering apparatus 12 is configured to be operated by a driver D when steering the land vehicle 10. The steering apparatus 12 includes a steering column 13 and a steering wheel 14, which is rotatably disposed at the rear side of the steering column 13. The steering column 13 incorporates a steering shaft 15, which transmits rotation of the steering wheel 14 to a steering gear box (not shown). The steering shaft 15 is arranged to be inclined upward toward the rear end in the front-rear direction of the vehicle 10.

In the present embodiment, an axis L1 of the steering shaft 15 is used as a reference when describing each part of the steering wheel 14. The direction along the axis L1 will be referred to as a front-rear direction of the steering wheel 14. The direction that is orthogonal to the axis L1 and in which the steering wheel 14 is erected will be referred to as an up-down direction of the steering wheel 14. Therefore, the front-rear direction and the up-down direction of the steering wheel 14 are slightly inclined relative to the front-rear direction (horizontal direction) and the up-down direction (vertical direction) of the vehicle 10.

For purposes of illustration, the front-rear direction of the steering wheel 14 agrees with the horizontal direction, and the up-down direction of the steering wheel 14 agrees with the vertical direction in FIGS. 3, 4, 7 to 9, 11, and 12. The same applies to FIG. 14, which illustrates a related art.

Figure 2:
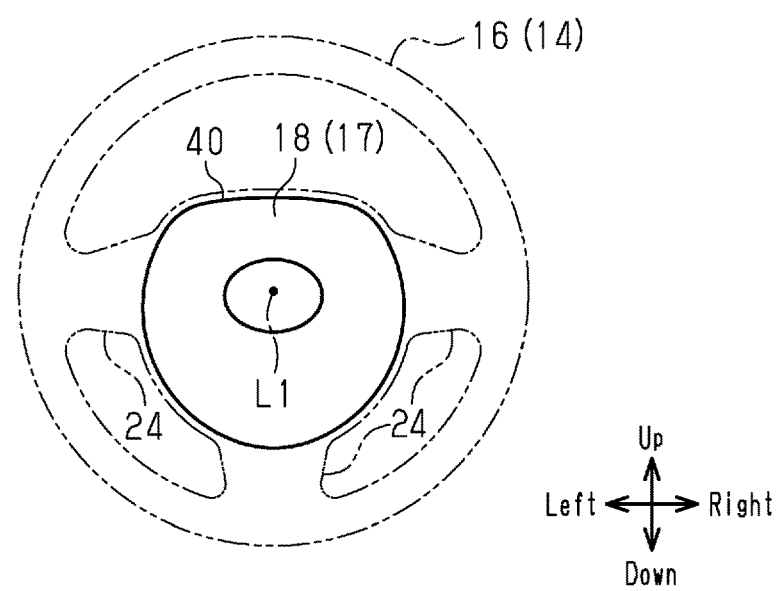
FIG. 2 is a rear view of the steering wheel to which an airbag apparatus is attached by the attachment mechanism of the embodiment.

As shown in FIG. 2, the steering wheel 14 includes a ring portion (also referred to as a grip portion or a rim portion) 16, a pad portion 17, and spoke portions 24. The ring portion 16 is gripped and rotated by the driver D. The ring portion 16 has an annular shape or a shape similar to an annular shape. The center of the ring portion 16 agrees with the axis L1. The pad portion 17 is disposed in a space surrounded by the ring portion 16. The spoke portions 24 are provided at one or more positions (three positions in FIG. 2) around the axis L1 and between the ring portion 16 and the pad portion 17. The steering wheel 14 is equipped with an airbag apparatus (airbag module) 40. The pad portion 17 forms a part of the airbag apparatus 40.

Figure 3:
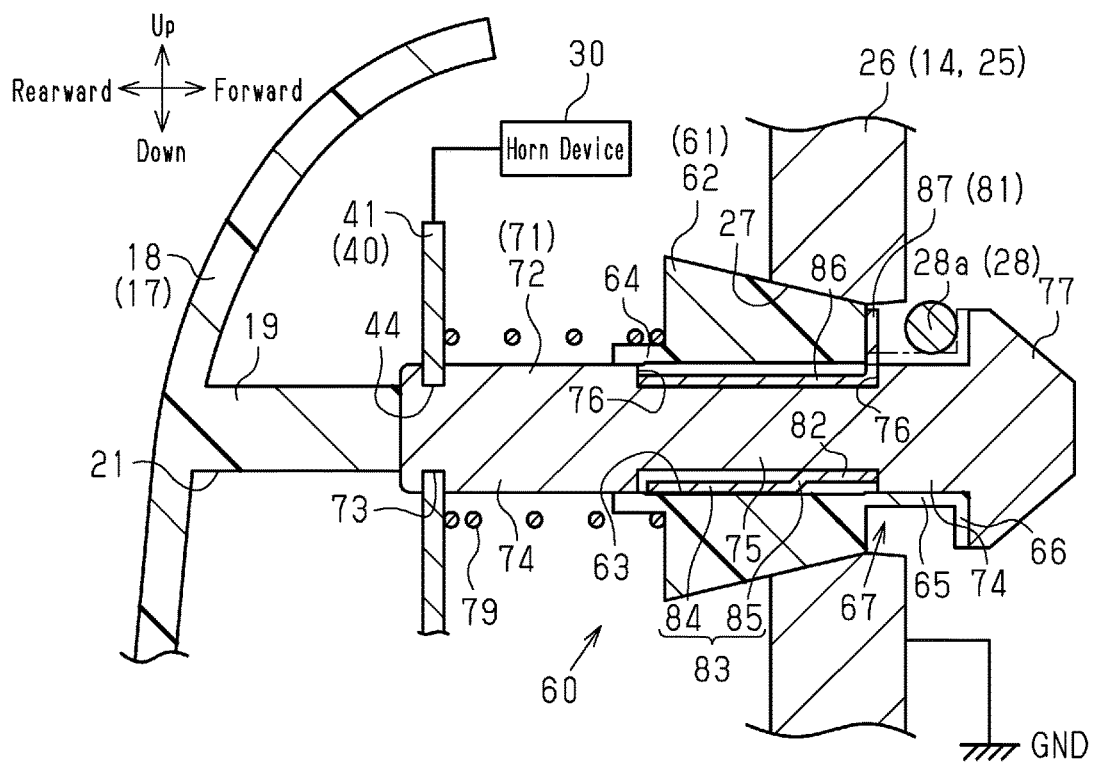
FIG. 3 is a partial cross-sectional side view illustrating a state of the attachment mechanism during a non-pushing action of the airbag apparatus in the embodiment.

As shown in FIG. 3, the framework of the steering wheel 14 includes a metal core 25. The metal core 25 is made of a conductive metal. The metal core 25 is grounded to the body of the vehicle 10 (ground GND). Although not illustrated, the metal core 25 is attached to the rear end of the steering shaft 15 to be rotated integrally with the steering shaft 15.

The metal core 25 includes holding portions 26 at positions surrounding the steering shaft 15 (three positions in the present embodiment, only one of which is shown in FIG. 3). Each holding portion 26 has a through-hole 27. Each through-hole 27 extends through the associated holding portion 26 in the front-rear direction. Most of each through-hole 27 except for the front end is shaped such that its inner diameter increases toward the rear end.

A fastening member 28 is disposed forward of and in the vicinity of each holding portion 26. The fastening member 28 is formed by bending a wire, made of metal such as spring steel having conductivity, into a predetermined shape. The number of the fastening members 28 may be one or more. When multiple fastening members 28 are provided, each holding portion 26 may be provided with one of the fastening members 28.

A part of the fastening member 28 is located forward of and in the vicinity of the through-hole 27. Although not illustrated in FIG. 3, the fastening member 28 is in contact with a front face of the metal core 25 at a position different from the through-hole 27. The fastening member 28 is held by the holding portion 26 so as to be attached to the metal core 25. The fastening member 28 includes an elastic portion 28a, which is elastically deformable in the radial direction of the through-hole 27.

The vehicle 10 includes a horn device 30, which is capable of producing a warning tone. The fastening member 28 forms a fixed contact of a horn switch that switches between activation and deactivation of the horn device 30.

The airbag apparatus 40 is disposed behind the metal core 25. The airbag apparatus 40 is attached to the metal core 25 with attachment mechanisms 60, the number of which is equal to the number of the through-holes 27. The attachment mechanisms 60 have an identical structure.

Each attachment mechanism 60 includes members that form the horn switch together with the fastening member 28. Each attachment mechanism 60 has a function of suppressing vibration of the airbag apparatus 40. Further, each attachment mechanism 60 has a function of supporting the airbag apparatus 40 on the metal core 25.

The airbag apparatus 40 and the attachment mechanism 60 will now be described respectively.

<Airbag Apparatus 40>

Figure 5:
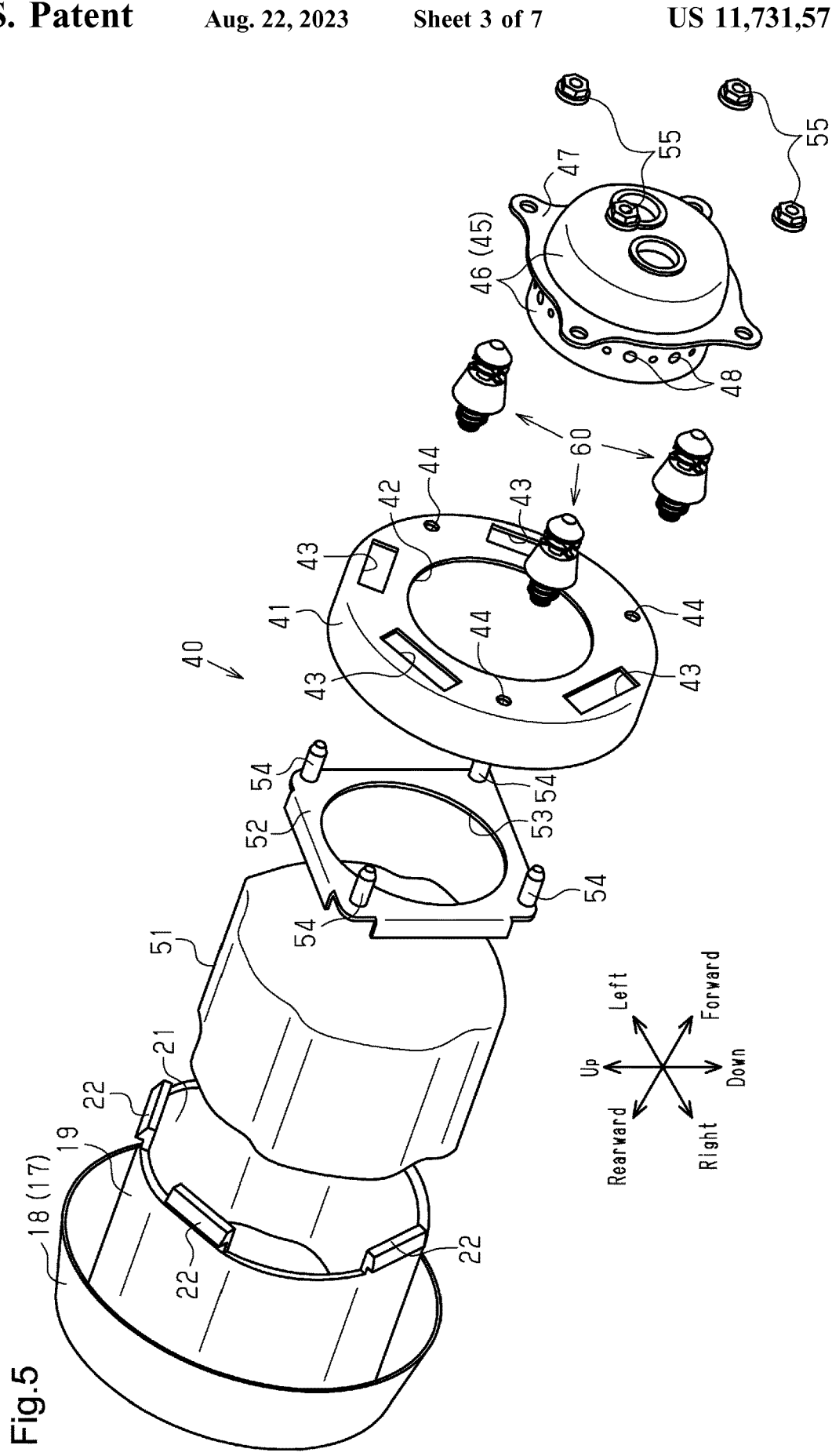
FIG. 5 is an exploded perspective view illustrating the airbag apparatus of the embodiment, together with the attachment mechanisms.

As shown in FIGS. 3 and 5, the airbag apparatus 40 includes a bag holder 41, an inflator 45, an airbag 51, and a ring retainer 52, in addition to the above-described pad portion 17.

The pad portion 17 includes an outer cover 18, which includes a decorative surface, and a tubular accommodating wall 19 having an open front end face. The space surrounded by the outer cover 18 and the accommodating wall 19 forms a bag storing space 21, which is primarily used to store the airbag 51. The accommodating wall 19 includes locking lugs 22 at multiple positions at the front end.

The bag holder 41 is formed by pressing a metal plate having conductivity. The bag holder 41 has an opening 42. Also, the bag holder 41 has locking holes 43 at positions forward of the locking lugs 22. Each locking lug 22 is inserted into and locked to the corresponding locking hole 43, so that the bag holder 41 is attached to the accommodating wall 19.

The inflator 45 and the airbag 51 are attached to the bag holder 41. More specifically, the inflator 45 includes a substantially columnar main body 46. The main body 46 includes a flange 47 on the outer circumference. The main body 46 incorporates a gas generating agent (not shown) that generates inflation gas. The main body 46 has gas discharge holes 48 at multiple positions behind the flange 47.

The inflator 45 is inserted into the opening 42 of the bag holder 41 such that the part of the main body 46 behind the flange 47 protrudes toward the bag storing space 21.

The airbag 51 is made of a fabric having a high strength and flexibility such as a woven fabric. The airbag 51 has an opening at its front section (not shown in FIG. 5). Most of the airbag 51 except for at least the peripheral edge of the opening is folded compactly. The peripheral edge of the opening of the airbag 51 is disposed behind the peripheral edge of the opening 42 of the bag holder 41.

The ring retainer 52 is used to attach the airbag 51 to the bag holder 41 at the peripheral edge of the opening of the airbag 51. The ring retainer 52 has an opening 53 similar to the opening 42 of the bag holder 41. The ring retainer 52 is disposed inside the airbag 51 so as to be located behind the opening of the airbag 51. The ring retainer 52 includes bolts 54 at multiple positions around the opening 53.

The bolts 54 are inserted into the airbag 51, the bag holder 41, and flange 47 of the inflator 45 from behind. Nuts 55 are fastened to the inserted bolts 54 from the front. As the nuts 55 are fastened, the airbag 51 is attached to the bag holder 41 with the ring retainer 52 in between, and the inflator 45 is attached to the bag holder 41 at the flange 47.

The bag holder 41 includes attachment holes 44 at multiple positions (three positions in the present embodiment) around the opening 42 at equal angular intervals. The attachment mechanisms 60 are attached to the attachment holes 44. The attachment holes 44 are located at positions behind the through-holes 27 of the metal core 25 (refer to FIG. 3).

<Attachment Mechanism 60>

Figure 6:
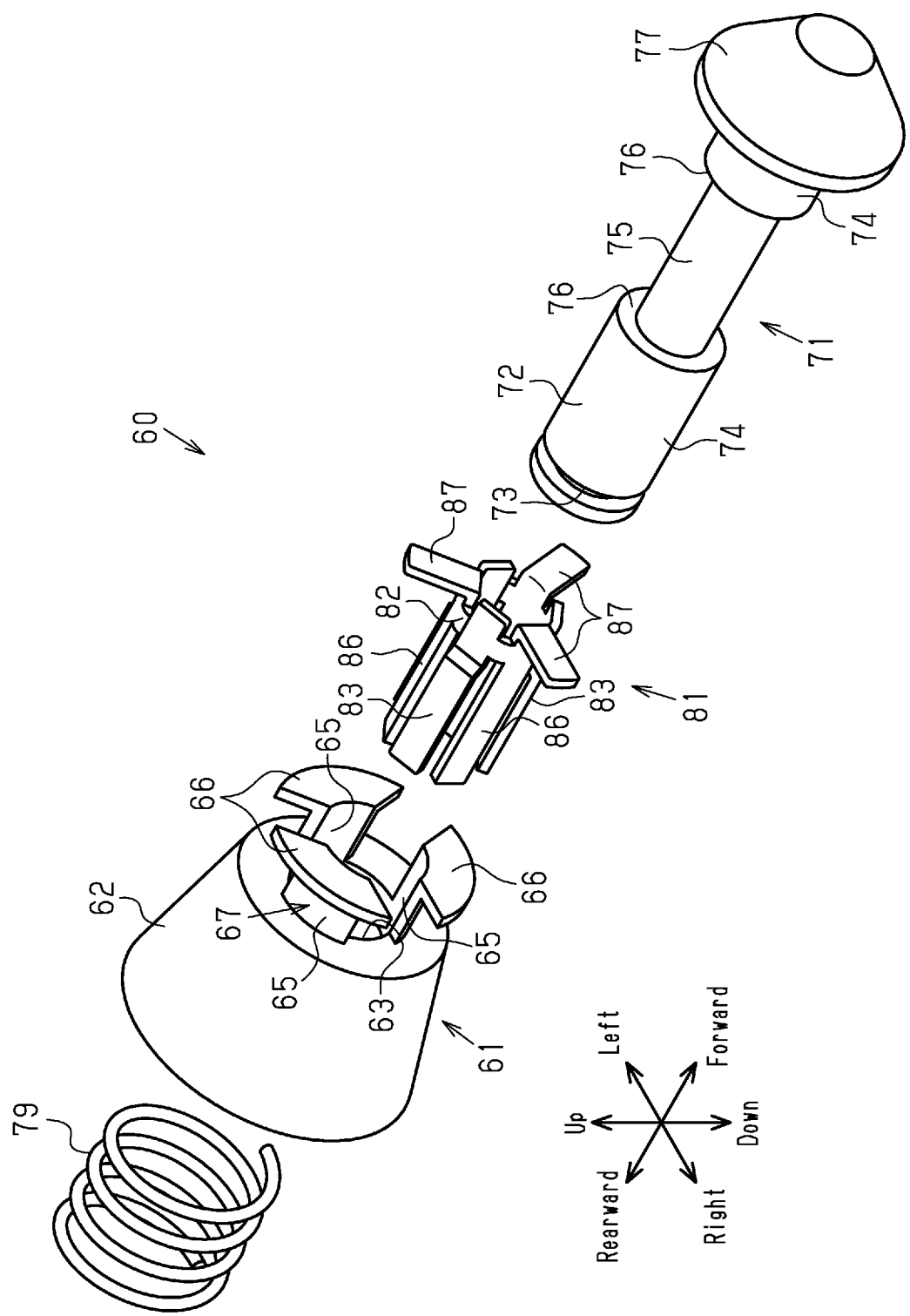
FIG. 6 is an exploded perspective view of the airbag apparatus attachment mechanism according to the embodiment.
Figure 7:
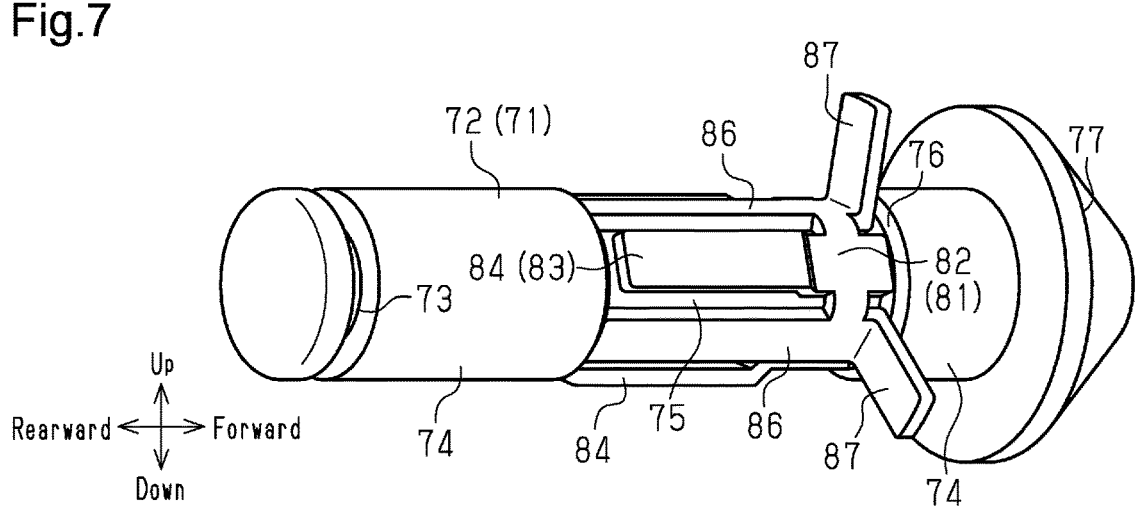
FIG. 7 is a perspective view of a supporting member to which a functional member is attached in the embodiment.
Figure 8:
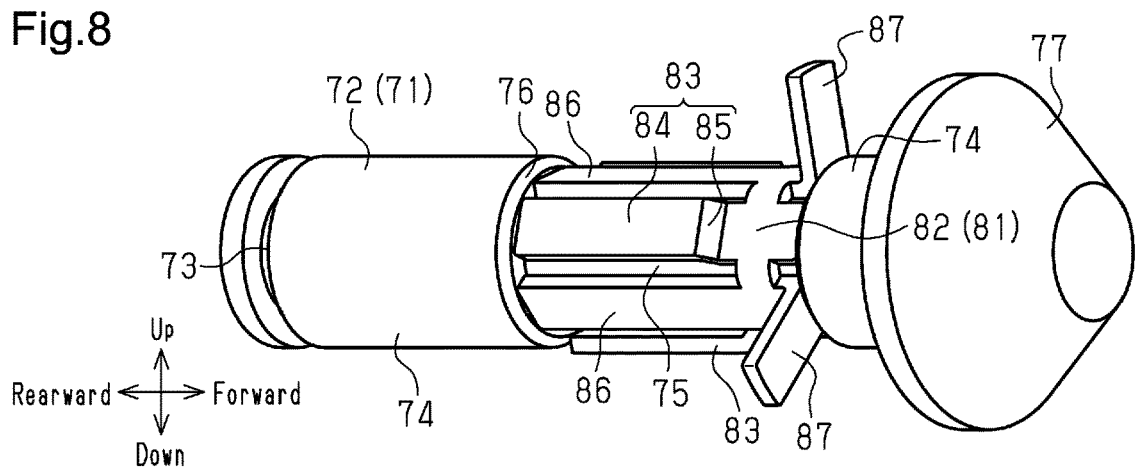
FIG. 8 is a perspective view of the supporting member to which the functional member is attached in the embodiment, as viewed in a direction different from that in FIG. 7.
Figure 9:
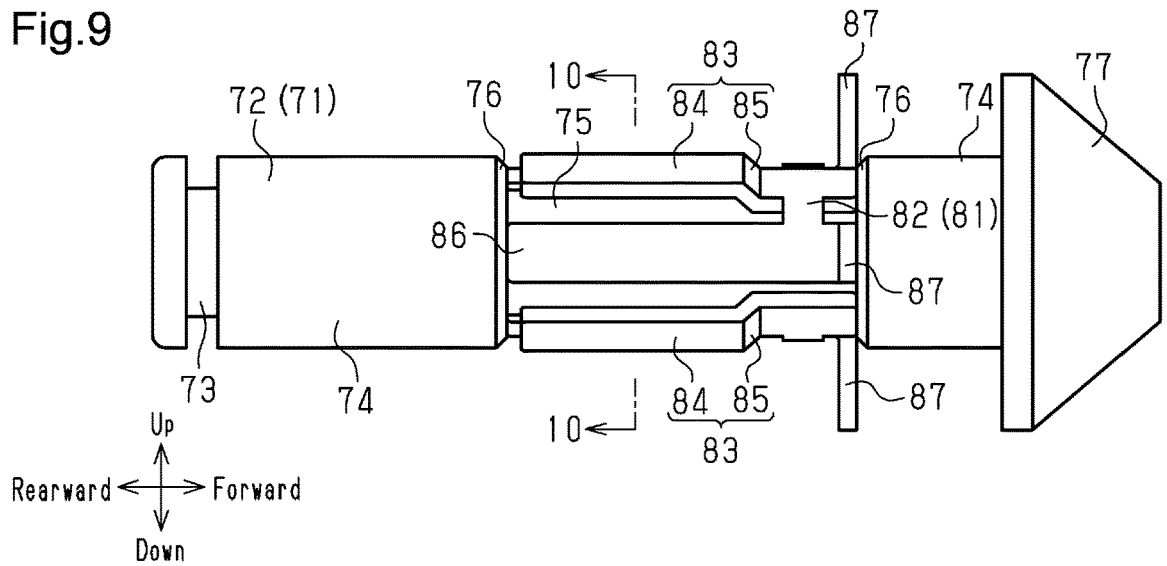
FIG. 9 is a side view of the supporting member to which the functional member is attached in the embodiment.

As shown in FIGS. 3 and 6, each attachment mechanism 60 includes a holder 61, a supporting member 71, an urging member 79, and a functional member 81. The respective components of the attachment mechanism 60 will now be described.

<Holder 61>

The framework of each holder 61 includes a holder main body 62. The outer circumferential surface of the holder main body 62 is tapered such that the outer diameter decreases toward the front end. The holder main body 62 includes an insertion hole 63 at the center. The insertion hole 63 has a circular cross section and extends in the front-rear direction.

The holder main body 62 has an annular protrusion 64 in the area on the rear surface around the insertion hole 63. The annular protrusion 64 protrudes rearward. The holder main body 62 has supporting plate portions 65 at multiple positions (three positions) around the insertion hole 63 in the front face of the holder main body 62. The supporting plate portions 65 protrude forward. The supporting plate portions 65 are curved to bulge outward in the radial direction of the insertion hole 63. An arcuate locking plate portion 66 is formed at the front end of each supporting plate portion 65. Each locking plate portion 66 is curved to bulge outward in the radial direction in correspondence with the supporting plate portions 65. Each locking plate portion 66 is connected to the front end of the corresponding supporting plate portion 65 at the inner edge.

Each holder 61 includes an annular receiving portion 67 at the front end. Part of the receiving portion 67 is formed by a space around the supporting plate portions 65 and between the holder main body 62 and locking plate portions 66.

The entire holder 61, which has the above-described configuration, is made of a material having an electrical insulating property, which is a plastic in the present embodiment. The holder 61 is inserted into the corresponding through-hole 27 of the metal core 25. Specifically, the front end of the holder main body 62 is fitted into the through-hole 27. The front end face of the holder main body 62 is located inside the through-hole 27. The rear sections of the supporting plate portions 65 are located inside the through-hole 27. The entire locking plate portions 66 and the front sections of the supporting plate portions 65 are located forward of the through-hole 27 (the metal core 25).

The elastic portion 28a of the corresponding fastening member 28 is located inside the receiving portion 67. The holder 61 is fastened to the metal core 25 by the fastening member 28.

<Supporting Member 71>

A shown in FIGS. 3 and 7 to 10, each supporting member 71 includes a shank 72 and a head 77, and is entirely made of a conductive material such as a conductive metal.

The shank 72 has a circular cross section (refer to FIG. 10) and extends in the front-rear direction. The shank 72 includes a small diameter portion 73, two general portions 74, a locking portion 75, and two step portions 76. The small diameter portion 73 is located at the rear end of the shank 72. The small diameter portion 73 is formed to have a smaller diameter than the general portions 74, and is inserted into the corresponding attachment hole 44 of the bag holder 41 from the front. Part of the small diameter portion 73 that protrudes rearward from the attachment hole 44 is crushed, so as to have a diameter larger than that before being crushed. The rear end of the shank 72 is swaged in this manner, so that the supporting member 71 is attached to the bag holder 41 at the peripheral edge of the attachment hole 44, while being electrically connected to the bag holder 41.

The rear end of the shank 72 may be attached to the bag holder 41 by a method different from the above-described swaging. For example, an annular groove may be formed in the outer circumferential surface of the rear end of the shank 72, and the peripheral edge of the attachment hole 44 may be engaged with the annular groove.

Most of the shank 72, except for the rear end, protrudes further forward than the bag holder 41 (airbag apparatus 40). The shank 72 is inserted into the insertion hole 63 of the holder main body 62 to be slidable in the front-rear direction.

The two general portions 74 are formed at positions in the shank 72 that are separated from each other in the front-rear direction. The rear general portion 74 is adjacent to the small diameter portion 73. The general portions 74 have the same outer diameter. The locking portion 75 is located between the two general portions 74. The locking portion 75 is formed to have a smaller diameter than the general portions 74. Each step portion 76 is formed between one of the general portions 74 and the locking portion 75, and has an annular shape.

The head 77 is adjacent to the front general portion 74. The head 77 is located forward of the locking plate portions 66 of the holder 61. Most of the outer circumferential surface of the head 77 except for the rear end is tapered such that the outer diameter decreases toward the front end. At least the rear end of the head 77 has a diameter larger than that of the general portions 74.

<Urging Member 79>

Referring to FIGS. 3 and 6, the urging members 79 are configured to urge the airbag apparatus 40 rearward in relation to the holders 61, that is, in relation to the metal core 25. In the present embodiment, coil springs are used as the urging members 79. Each urging member 79 is disposed in a compressed state between the bag holder 41 and the corresponding holder 61 and around the corresponding supporting member 71. The front end of the urging member 79 is disposed around the annular protrusion 64 of the holder 61 and is in contact with the rear surface of the holder main body 62.

<Functional Member 81>

Figure 11:
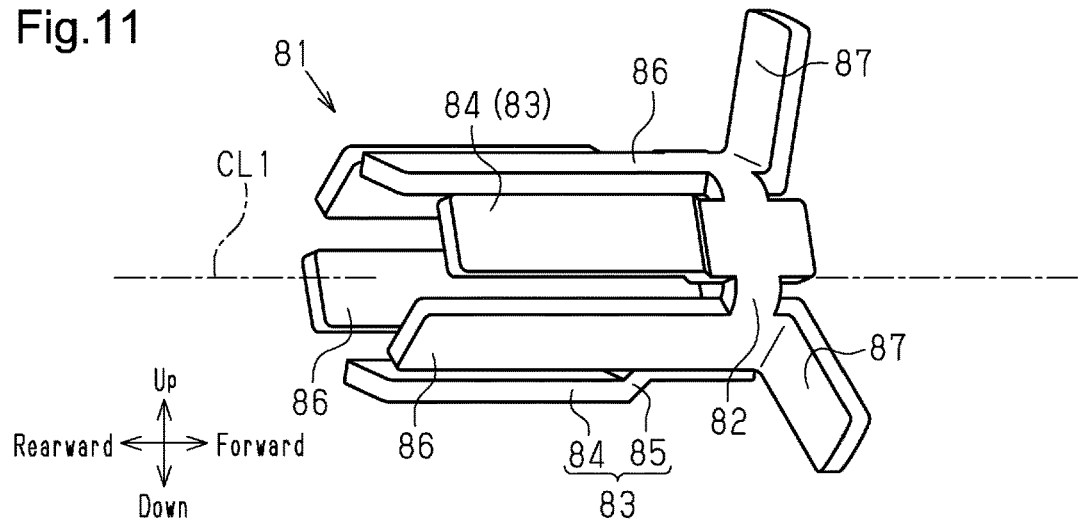
FIG. 11 is a perspective view of the functional member in the embodiment.
Figure 12:
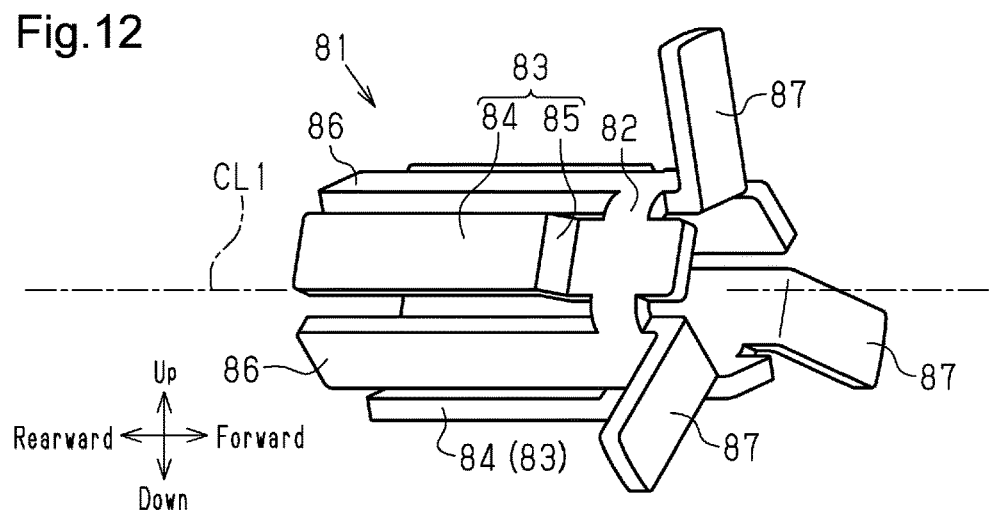
FIG. 12 is a perspective view of the functional member in the embodiment, as viewed in a direction different from that in FIG. 11.

Referring to FIGS. 11 and 12, each functional member 81 is entirely made of a conductive material. In the present embodiment, each functional member 81 is formed by bending a plate made of a conductive metal. As shown in FIG. 3, this plate has a thickness smaller than the gap between the inner wall of the insertion hole 63 of the holder 61 and the locking portion 75 of the supporting member 71.

The functional member 81 is attached to part of the supporting member 71 that is inserted in the holder 61, while being restricted from moving in the front-rear direction. The functional member 81 is slidable relative to the holders 61 in the front-rear direction together with the supporting member 71.

As shown in FIGS. 3, 11, and 12, each functional member 81 includes a base 82, spring portions 83, attachment portions 86, and movable contacts 87. The base 82 surrounds part of the locking portion 75 in the front-rear direction (the front section of the locking portion 75 in the present embodiment). The base 82 has an annular shape close to a hexagon (refer to FIG. 13). One end in the circumferential direction of the base 82 is close to or in contact with the other end. The base 82 is close to or in contact with the locking portion 75.

Figure 10:
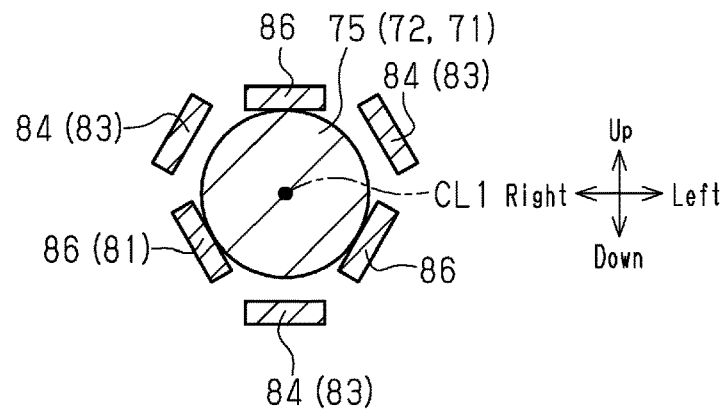
FIG. 10 is a cross-sectional view taken along line 10-10 in FIG. 9.
Figure 13:
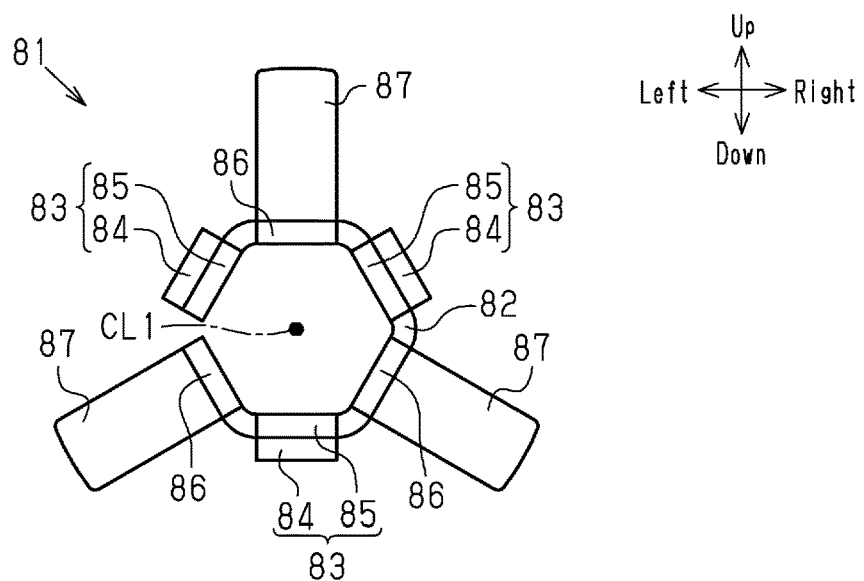
FIG. 13 is a rear view of the functional member in the embodiment.

As shown in FIG. 10, the number of the spring portions 83 is three in the present embodiment. The spring portions 83 are arranged at equal angular intervals around the locking portion 75. Each spring portion 83 is thinner than the gap between the locking portion 75 and the holder 61 (refer to FIG. 3). As shown in FIGS. 11 to 13, each spring portion 83 includes an elastic main body 84 and a coupling portion 85. The elastic main body 84 of each spring portion 83 has the shape of a rectangular plate that extends in the front-rear direction while being separated outward from the locking portion 75 in the radial direction. The outer surface of the elastic main body 84 is in contact with the inner wall surface of the holder 61 (refer to FIG. 3).

The coupling portion 85 of each spring portion 83 has the shape of a plate, and couples one end in the front-rear direction of the elastic main body 84 (front end in the present embodiment) to the base 82. When the airbag apparatus 40 vibrates, each functional member 81 allows the spring portions 83 to be elastically deformed in the radial direction of the supporting member 71 about the coupling portions 85, thereby suppressing the vibration.

As shown in FIGS. 3, 10, and 13, the number of the attachment portions 86 is three, which is equal to the number of the spring portions 83, in the present embodiment. The attachment portions 86 each have the shape of a plate and are disposed between adjacent two of the spring portions 83 around the locking portion 75. Each attachment portion 86 is located on the opposite side of a central axis CL1 of the functional member 81 to the corresponding spring portion 83. In other words, each attachment portion 86 is opposed to the corresponding spring portion 83 with the central axis CL1 in between. Each attachment portion 86 extends in the front-rear direction while being in contact with the locking portion 75. Each attachment portion 86 is coupled to the base 82 at its front end.

The number of the movable contacts 87 is three in the present embodiment. The movable contacts 87 are arranged at equal angular intervals around the locking portion 75. In the circumferential direction of the locking portion 75, the movable contacts 87 are arranged at positions forward of the attachment portions 86 in the present embodiment. Each movable contact 87 has the shape of a plate and extends outward from the base 82 in the radial direction of the locking portion 75.

As described above, the functional member 81 is attached to the supporting member 71, while being restricted from moving in the front-rear direction. Accordingly, each movable contact 87 is movable in the front-rear direction together with the supporting member 71.

Figure 4:
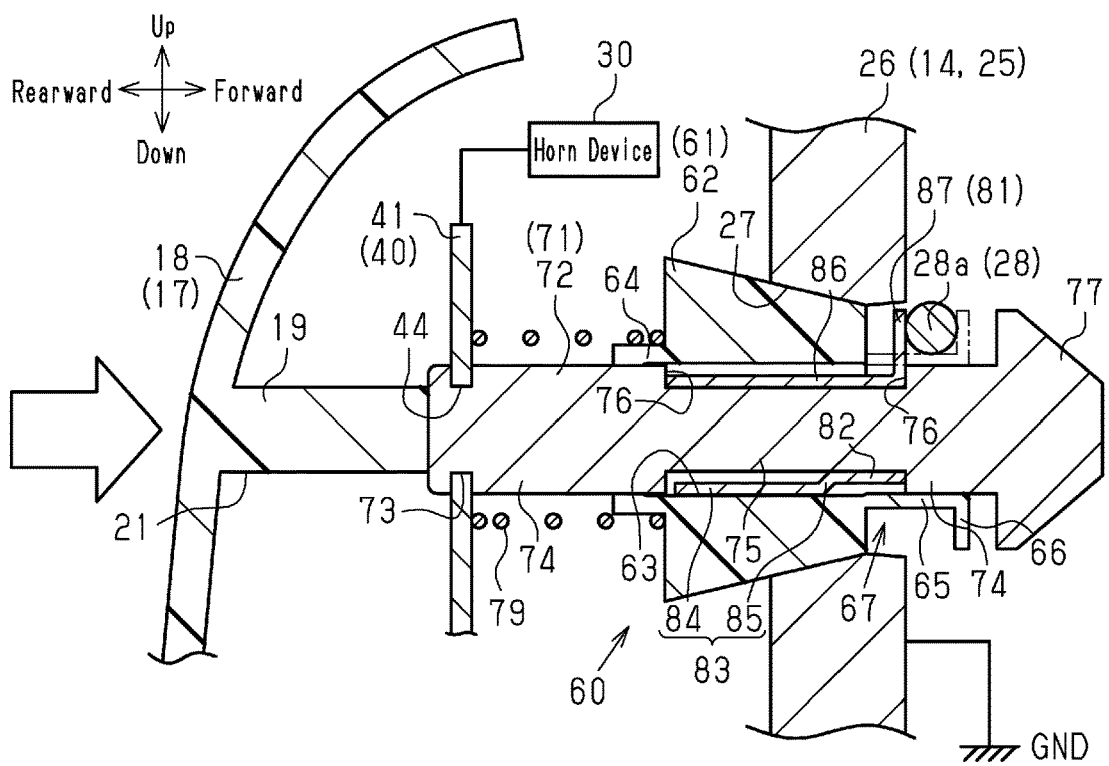
FIG. 4 is a partial cross-sectional side view illustrating a state of the attachment mechanism during a pushing action of the airbag apparatus in the embodiment.

As shown in FIG. 3, each movable contact 87 is part of the above-described horn switch. During a non-pushing action of the airbag apparatus 40, the movable contacts 87 are separated rearward from the fastening members 28, deactivating the horn switch. As shown in FIG. 4, when the airbag apparatus 40 is pushed, the movable contact 87 contacts the fastening member 28, activating the horn switch.

As described above, each attachment mechanism 60 is formed as an assembly in which separate components are unitized. That is, the holder 61, the supporting member 71, the urging member 79, and the functional member 81 are unitized to form the attachment mechanism 60. Accordingly, when the airbag apparatus 40 is attached to the metal core 25, the unitized attachment mechanisms 60 can be treated as aggregate objects.

Operations in different situations of the present embodiment will now be described. Advantages that accompany the operations will also be described.

<Operation for Attaching the Airbag Apparatus 40>

This operation is performed with the attachment mechanisms 60 attached to the bag holder 41. In this state, the urging members 79 are generating force that moves the bag holder 41 and the holders 61 away from each other in the front-rear direction. The force applied to the bag holder 41 is transmitted to the supporting members 71 attached to the bag holder 41. The head 77 of each supporting member 71 is in contact with the locking plate portions 66 of the corresponding holder 61 from the front.

The attachment mechanisms 60 in the above-described state are each inserted into the corresponding through-hole 27 in the metal core 25 from behind. The head 77, the front general portion 74, and the front end of the locking portion 75 of each supporting member 71 are inserted into the corresponding through-hole 27. The front section of each functional member 81, which includes the movable contacts 87, is inserted into the corresponding through-hole 27. The supporting plate portions 65, the locking plate portions 66, and the front section of the holder main body 62 of each holder 61 are inserted into the corresponding through-hole 27.

During the insertion, the head 77 of the supporting member 71 contacts the elastic portion 28a of the fastening member 28. Further, when the attachment mechanism 60 is moved forward against the urging force of the elastic portion 28a, the elastic portion 28a is elastically deformed outward in the radial direction of the supporting member 71. Then, when the locking plate portions 66 of the holder 61 are moved further forward than the elastic portion 28a, that is, when the receiving portion 67 is opposed to the elastic portion 28a, the elastic portion 28a is engaged with the receiving portion 67 due to its elastic restoring force. The part of the elastic portion 28a of the fastening member 28 that is located forward of the through-hole 27 is held by the metal core 25 and the locking plate portions 66 from the front and the rear, so as to be restricted from moving in the front-rear direction. On the other hand, when the elastic portion 28a is engaged with the receiving portion 67, the holder main body 62 is fitted in the through-hole 27. The holder 61 is restricted from moving in the front-rear direction by the fastening member 28 and the inner wall surface of the through-hole 27. In this manner, the holder 61 is locked to the metal core 25 by the elastic portion 28a of the fastening member 28. Accordingly, the airbag apparatus 40 is attached to the metal core 25 at the same time as the attachment mechanisms 60 are fastened to the metal core 25.

The above-described structure is referred to as a snap-fit structure, in which the elastic portion 28a of the fastening member 28 locks the holder 61 to the metal core 25 during insertion into the through-hole 27.

The simple operation described above, in which the front section of each attachment mechanism 60 is inserted into the corresponding through-hole 27, allows each attachment mechanism 60 to be attached to the metal core 25, using the snap-fit structure.

<Operation at a Normal Time (when there is No Collision)>

When the vehicle 10 is free from impact from the front due to a frontal collision (normal time), gas is not ejected from the gas discharge holes 48 of the inflator 45, and the airbag 51 remains folded in the airbag apparatus 40.

The step portions 76 are located on the opposite sides in the front-rear direction of each functional member 81. The functional member 81 is restricted from moving in the front-rear direction with respect to the corresponding supporting member 71 by contacting the step portions 76.

<Operation in a Non-Pushing Action of the Airbag Apparatus 40>

When the airbag apparatus 40 is not being pushed during a normal time as shown in FIG. 3, the airbag apparatus 40, which is urged rearward by the urging members 79, is supported by the holders 61 fastened to the metal core 25 with the supporting members 71 in between.

Also, the base 82 of each functional member 81 surrounds part of the locking portion 75 in the front-rear direction. The movable contacts 87 extend outward from the base 82 in the radial direction of the supporting member 71. Accordingly, the movable contacts 87 are attached to the locking portion 75 via the base 82 in a stable manner.

All the movable contacts 87 of the functional members 81 are separated rearward from the fastening member 28. The movable contacts 87 and the fastening member 28 are electrically disconnected from each other (horn switch: OFF), so that the horn device 30 is not activated.

When the airbag apparatus 40 vibrates relative to the metal core 25 in the radial direction of the supporting members 71, the vibration is transmitted to the supporting members 71 and the functional members 81 attached to the supporting members 71. The transmission of the vibration causes the supporting members 71 to vibrate in the radial direction together with the functional members 81. The spring portions 83 are formed to be thinner than the gap between the inner wall surface of the insertion hole 63 of the holder 61 and the locking portion 75 of the supporting member 71, and are elastically deformable in the radial direction of the supporting member 71. Thus, elastic deformations of the spring portions 83 allow the supporting member 71 to vibrate in the radial direction. Also, elastic deformations of the spring portions 83 in the radial direction relative to the supporting member 71 suppress the above-described vibration of the supporting member 71, and thus, the vibration of the airbag apparatus 40.

Particularly, in the present embodiment, each functional member 81 includes the base 82, which surrounds part of the locking portion 75 in the front-rear direction. The base 82 functions as at least a part of the section of the functional member 81 that is attached to the locking portion 75. The coupling portion 85 of each spring portion 83 couples the corresponding elastic main body 84, which extends in the front-rear direction, to the base 82.

Each spring portion 83 has a cantilever-like support structure including a fixed end and a free end. The fixed end is the front end of the elastic main body 84 in the front-rear direction and is coupled to the base 82 by the coupling portion 85. The free end is the rear end, which is not coupled to anything. Thus, each spring portion 83 is elastically deformed more easily than in a case in which another support structure is employed. Therefore, vibration of the airbag apparatus 40 is suppressed efficiently by elastic deformation of the spring portions 83.

Also, the spring portions 83 are arranged at three positions at equal angular intervals around each supporting member 71. Thus, when the airbag apparatus 40 vibrates relative to the metal core 25 in the radial direction of the supporting members 71, at least some of the spring portions 83 are elastically deformed. Therefore, it is possible to suppress the vibration regardless of the direction of the vibration and regardless of the positions of the spring portions 83 in the circumferential direction of the supporting members 71.

In the present embodiment, the functional members 81 are attached to the section of each supporting member 71 that is inserted in the holder 61, with the elastic main body 84 of each spring portion 83 in contact with the inner wall surface of the holder 61. Thus, the spring portions 83 are elastically deformed at an earlier stage than in a case in which the elastic main bodies 84 are separated from the inner wall surface. Accordingly, the vibration is suppressed at an earlier stage. Also, in a case in which the elastic main bodies 84 are separated from the inner wall surface of the holder 61, noise may be produced when the elastic main bodies 84 contact the inner wall surface. Such noise is not produced in the present embodiment since the elastic main bodies 84 are in contact with the inner wall surface of the holder 61.

Each of the attachment portions 86 is disposed between adjacent two of the spring portions 83 and is coupled to the base 82 at the front end. Each attachment portion 86 contacts the locking portion 75 so as to function, together with the base 82, as a section at which the functional member 81 is attached to the supporting member 71. In this manner, the functional member 81 is attached to the locking portion 75 at multiple sections including the base 82 and the attachment portions 86. Therefore, the elastic main bodies 84 are stably maintained in a state of being separated outward in the radial direction from a section of the locking portion 75 that is not surrounded by the base 82.

Particularly, in the present embodiment, the multiple (three) attachment portions 86 are in contact with the locking portion 75, while being arranged at multiple (three) positions in the circumferential direction of the locking portion 75 at equal angular intervals. Therefore, all the elastic main bodies 84 are maintained in a state of being separated from the locking portion 75 in a stable manner.

<Operation in a Pushing Action of the Airbag Apparatus 40>

When the airbag apparatus 40 is pushed in a direction indicated by the arrow in FIG. 4 against the urging force of the urging members 79 in order to activate the horn device 30, the supporting member 71 of at least one of the attachment mechanisms 60 moves forward regardless of the position at which the airbag apparatus 40 is pushed. Accordingly, the movable contacts 87 of the functional member 81 attached to the locking portion 75 at the base portion 82 are moved forward. When any of the movable contacts 87 contacts the fastening member 28, the metal core 25, which is grounded to the body of the vehicle 10, and the bag holder 41, which is connected to the horn device 30, are electrically connected to each other via the supporting member 71, the functional member 81, and the fastening member 28. This turns on the horn switch, activating the horn device 30.

Particularly, in the present embodiment, the movable contacts 87 extend outward from the base 82, which surrounds the locking portion 75. Specifically, the movable contacts 87 extend in the radial direction from multiple positions in the circumferential direction of the locking portion 75. This structure allows a relatively large number of movable contacts 87, which can contact the fastening members 28, to be provided. At least one of the movable contacts 87 can be brought into contact with the fastening members 28. Thus, in a case in which the supporting member 71 is slid forward together with the functional member 81 in response to a pushing action of the airbag apparatus 40, the movable contacts 87 are more likely to contact the fastening member 28, as compared to a case in which only one movable contact 87 is provided.

<Activation of the Airbag Apparatus 40>

When an impact is applied to the vehicle 10 from the front, for example, due to a frontal collision while the vehicle 10 is traveling, the body of the driver D starts to lean forward due to the inertia. Meanwhile, the inflator 45 of the airbag apparatus 40 is activated in response to the impact, so that inflation gas is ejected from the gas discharge holes 48. When supplied with the inflation gas, the airbag 51 inflates while being unfolded (deploying). When the pushing force applied to the outer cover 18 of the pad portion 17 is increased by the airbag 51, the outer cover 18 is ruptured. The airbag 51 continues to be deployed and inflated rearward through the opening formed by the rupture. The deployed and inflated airbag 51 is located in front of the driver D, whose body has started to lean forward due to the impact of the frontal collision. The airbag 51 restrains the forward leaning movement of the driver D to protect the driver D from the impact <Downsizing Part of the Attachment Mechanism 60 Attached to the Airbag Apparatus 40>

Figure 14:
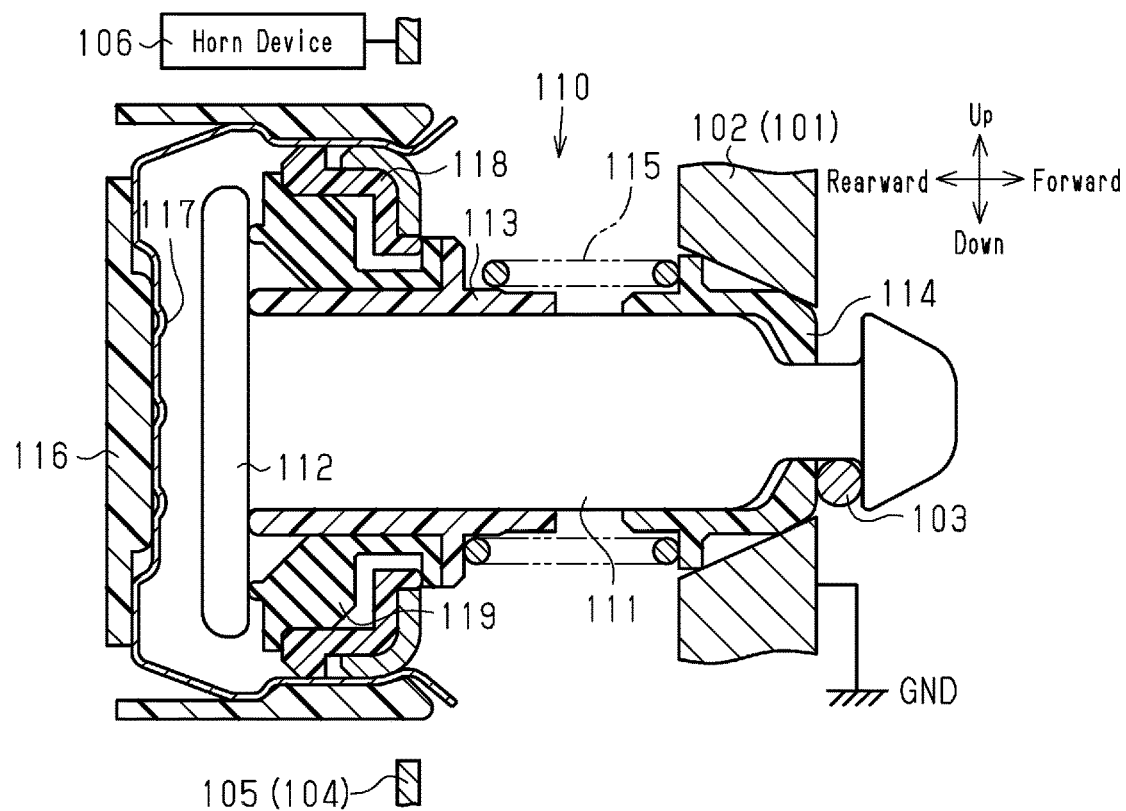
FIG. 14 is a partial cross-sectional side view showing an airbag apparatus attachment mechanism of a related art.

As shown in FIG. 14, Japanese Laid-Open Patent Publication No. 2017-197185 includes a portion that forms a horn switch (fixed contact 112, movable contact 117) and a portion that has a vibration suppressing function (elastic member 119). These portions are disposed in a part of the attachment mechanism 110 that is attached to the airbag apparatus 104. Due to the influence of the attached part, the size of the pad portion may be increased in the radial direction of the supporting member 111, or the flexibility in the shape of the pad portion may be reduced.

In contrast, the spring portions 83 of the present embodiment, which have a vibration suppressing function, are located between the above-described supporting member 71 and the holder 61. Also, the spring portions 83 are located in a part of the attachment mechanism 60 that is attached to the metal core 25 as shown in FIG. 3.

Also, each functional member 81, which forms part of the horn switch, is located in a part of the attachment mechanism 60 that is attached to the metal core 25. Also, each fastening member 28, which forms another part of the horn switch, is located forward of the metal core 25.

Thus, the present embodiment reduces the size of the part of the attachment mechanism 60 that is attached to the airbag apparatus 40 in the radial direction of the supporting member 71 as compared to Japanese Laid-Open Patent Publication No. 2017-197185.

Accordingly, the shape and the size of the pad portion 17 are unlikely to be influenced by the part of each attachment mechanism 60 that is attached to the airbag apparatus 40. As a result, the present embodiment limits the increase in the size of the pad portion 17 in the radial direction of the supporting member 71 and the reduction in the flexibility in the shape of the pad portion 17.

In addition to the ones listed above, the present embodiment has the following advantages.

The functional members 81 not only suppress vibration, but also form part of the horn switch. Thus, as compared to a configuration that includes a member having a vibration suppressing function and a member forming a horn switch separately, the present embodiment reduces the number of components of the attachment mechanism 60 and the size of the attachment mechanism 60.

As shown in FIG. 14, the attachment mechanism 110 of Japanese Laid-Open Patent Publication No. 2017-197185 is formed by eight components, which are the supporting member 111, the slider 113, the spring seat 114, the spring 115, the cap member 116, the movable contact 117, the damper holder 118, and the elastic member 119.

In contrast, each attachment mechanism 60 of the present embodiment is formed by four components, which are the holder 61, the supporting member 71, the functional member 81, and the urging member 79, as shown in FIG. 6. Further, each of the attachment mechanisms 60 has a vibration suppressing function and a function of switching the horn device 30, as in the case of the attachment mechanism 110 of Japanese Laid-Open Patent Publication No. 2017-197185. Thus, the present embodiment is capable of achieving the attachment mechanism 60 with fewer components while maintaining the functions.

The reduction in the number of components of the attachment mechanism 60 is achieved partly by employing a common member (functional member 81) for suppressing vibration and forming a part of the horn switch. Also, the reduction in the number of components is achieved by causing the elastic portion 28a of the fastening member 28 to function as a fixed contact. That is, no fixed contacts need to be provided separately in addition to the fastening members 28.

The above-described embodiment may be modified as follows. The above-described embodiment and the following modification can be combined as long as the combined modifications remain technically consistent with each other.

<Modification Related to the Holder 61>

The number of sets of the supporting plate portions 65 and the locking plate portions 66 in each holder 61 may be different from the number in the above-described embodiment.

<Modification Related to the Urging Member 79>

The urging members 79 may be replaced by springs other than coil springs or by elastic members different from springs as long as the urging members urge the airbag apparatus 40 (bag holder 41) rearward in relation to the metal core 25 (holders 61).

<Modification Related to the Functional Member 81>

The elastic main bodies 84 may be connected to the base 82 at positions in the middle or at the rear end in the longitudinal direction.

The number of the spring portions 83 in each functional member 81 may be greater than three. The spring portions 83 are arranged at equal angular intervals around the supporting member 71. In accordance with the change in the number of the spring portions 83, the number of the attachment portions 86 is changed to the same number as the changed number of the spring portions 83.

The outer surface of each elastic main body 84 may be slightly separated from the inner wall surface of the holder 61.

The spring portions 83 may have a shape different from the shape of a plate as long as they are thinner than the gap between the supporting member 71 and the holder 61.

The movable contacts 87 may be disposed at positions different from positions forward of the attachment portions 86 in the circumferential direction of the supporting member 71. For example, the movable contacts 87 may be disposed at positions forward of the spring portions 83.

OTHER MODIFICATIONS

In order to attach the airbag apparatus 40 to the metal core 25, the attachment mechanisms 60 of a number different from that in the above-described embodiment may be employed.

Part of the horn switch may be formed by members or mechanisms that are different from the functional members 81. These members or mechanisms may be provided as part of the attachment mechanisms 60 or separately from the attachment mechanisms 60.

Vibration of the airbag apparatus 40 may be suppressed by members or mechanisms different from the functional members 81. These members or mechanisms may be provided as part of the attachment mechanisms 60 or separately from the attachment mechanisms 60.

The airbag apparatus attachment mechanism of the above-described embodiment may also be employed to attach an airbag apparatus to a steering wheel of a vehicle other than a land vehicle, for example, an aircraft or a ship.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. An airbag apparatus attachment mechanism configured to attach an airbag apparatus disposed rearward of a metal core of a steering wheel of a vehicle to the metal core, the airbag apparatus attachment mechanism comprising:
   a holder that is inserted into the metal core and fastened to the metal core by a fastening member;
   a supporting member that is attached to the airbag apparatus, the supporting member extending further forward than the airbag apparatus and being inserted into the holder;
   an urging member that is disposed between the airbag apparatus and the holder and urges the airbag apparatus rearward; and
   a functional member that is attached to a first part of the supporting member that is inserted in the holder, the functional member being restricted from moving relative to the supporting member in a front-rear direction,
   wherein
   the functional member includes:
      a base that surrounds the first part of the supporting member in the front-rear direction;

a spring portion that is thinner than a gap between the supporting member and the holder, the spring portion being disposed in the gap; and an attachment portion that is disposed in the gap and coupled to the base, the attachment portion extending in the front-rear direction while being in contact with the supporting member, the spring portion includes:

an elastic main body that extends in the front-rear direction while being separated outward in a radial direction of the supporting member from a second part of the supporting member that is not surrounded by the base; and a coupling portion that couples the elastic main body to the base, the attachment portion extends in the front-rear direction while being separated from the holder, the functional member is configured such that the spring portion is elastically deformed in the radial direction of the supporting member due to vibration of the airbag apparatus, thereby suppressing the vibration, the supporting member includes:

two general portions at positions separated from each other in the front-rear direction, the general portions being columnar;

a locking portion between the general portions, the locking portion being columnar and having a diameter smaller than those of the general portions; and two step portions formed at boundaries between the locking portion and the respective general portions, the base surrounds a first part of the locking portion in the front-rear direction, the attachment portion is in contact with a second part of the locking portion that is not surrounded by the base, and the elastic main body is separated outward in the radial direction from the second part of the locking portion that is not surrounded by the base.

2. The airbag apparatus attachment mechanism according to claim 1, wherein the coupling portion couples an end of the elastic main body in the front-rear direction to the base.

3. The airbag apparatus attachment mechanism according to claim 1, wherein the spring portion includes multiple spring portions, the multiple spring portions are arranged at three or more positions around the supporting member at equal angular intervals, and the attachment portion is disposed between adjacent two of the spring portions.

4. The airbag apparatus attachment mechanism according to claim 1, wherein the attachment portion is coupled to the base at an end in the front-rear direction.

5. The airbag apparatus attachment mechanism according to claim 1, wherein the fastening member, the supporting member, and the functional member are each made of a conductive material, the holder is made of a material having an electrical insulating property, the supporting member is inserted into the holder to be slidable in the front-rear direction, the fastening member forms a fixed contact of a horn switch that switches between activation and deactivation of a horn device in the vehicle, the functional member includes a movable contact that forms the horn switch together with the fixed contact, and the functional member is configured to:

during a non-pushing action of the airbag apparatus, cause the movable contact to be separated rearward from the fastening member to turn off the horn switch, thereby deactivating the horn device, and as a pushing action of the airbag apparatus is performed, cause the movable contact to contact the fastening member to turn on the horn switch, thereby activating the horn device.

6. The airbag apparatus attachment mechanism according to claim 1, wherein the fastening member is held at a position forward of the metal core, the fastening member includes an elastic portion that is elastically deformable in the radial direction of the supporting member, the holder includes a front end that is located forward of the metal core, the holder includes a receiving portion at the front end, the elastic portion being locked to the receiving portion, and the elastic portion and the receiving portion form a snap-fit structure in which the elastic portion is locked to the receiving portion as the holder is inserted into the metal core.

7. An airbag apparatus attachment mechanism configured to attach an airbag apparatus disposed rearward of a metal core of a steering wheel of a vehicle to the metal core, the airbag apparatus attachment mechanism comprising:

a holder that is made of a material having an electrical insulating property and inserted into the metal core, the holder being fastened to the metal core by a conductive fastening member;

a supporting member that is attached to the airbag apparatus, the supporting member extending further forward than the airbag apparatus and being inserted into the holder to be slidable in a front-rear direction;

an urging member that is disposed between the airbag apparatus and the holder and urges the airbag apparatus rearward; and a functional member that is made of a conductive material and is attached to a part of the supporting member that is inserted in the holder, the functional member being restricted from moving relative to the supporting member in the front-rear direction, wherein the fastening member forms a fixed contact of a horn switch that switches between activation and deactivation of a horn device in the vehicle, the functional member includes a movable contact that forms the horn switch together with the fastening member, and the functional member is configured to:

during a non-pushing action of the airbag apparatus, cause the movable contact to be separated rearward from the fastening member to turn off the horn switch, thereby deactivating the horn device, and as a pushing action of the airbag apparatus is performed, cause the movable contact to directly physically contact the fastening member to turn on the horn switch, thereby activating the horn device.

8. The airbag apparatus attachment mechanism according to claim 7, wherein the metal core is made of a conductive material and is grounded to a body of the vehicle, the supporting member is made of a conductive material, the horn device is electrically connected to the airbag apparatus, and the fastening member is attached to the metal core while being in contact with the metal core.

9. The airbag apparatus attachment mechanism according to claim 7, wherein the fastening member is held at a position forward of the metal core, the fastening member includes an elastic portion that is elastically deformable in a radial direction of the supporting member, the holder includes a front end that is located forward of the metal core, the holder includes a receiving portion at the front end, the elastic portion being locked to the receiving portion, and the elastic portion and the receiving portion form a snap-fit structure in which the elastic portion is locked to the receiving portion as the holder is inserted into the metal core.

10. The airbag apparatus attachment mechanism according to claim 7, wherein the functional member includes a base that surrounds the part of the supporting member in the front-rear direction, and the movable contact extends outward in a radial direction of the supporting member from the base.

11. The airbag apparatus attachment mechanism according to claim 10, wherein the movable contact includes multiple movable contacts, and the multiple movable contacts are disposed at multiple positions in a circumferential direction of the supporting member.

* * * * *